US006870792B2

(12) United States Patent
Chiappetta

(10) Patent No.: US 6,870,792 B2
(45) Date of Patent: Mar. 22, 2005

(54) SONAR SCANNER

(75) Inventor: Mark J. Chiappetta, Chelmsford, MA (US)

(73) Assignee: iRobot Corporation, Burlington, MA (US)

( * ) Notice: Subject to any disclaimer, the term of this patent is extended or adjusted under 35 U.S.C. 154(b) by 0 days.

(21) Appl. No.: 09/921,181

(22) Filed: Aug. 2, 2001

(65) Prior Publication Data
US 2003/0039171 A1 Feb. 27, 2003

Related U.S. Application Data
(60) Provisional application No. 60/222,542, filed on Aug. 3, 2000.

(51) Int. Cl.[7] ............................................. G01S 15/00
(52) U.S. Cl. ....................................................... 367/98
(58) Field of Search .......................... 367/98, 901, 100, 367/87, 908

(56) References Cited

U.S. PATENT DOCUMENTS

| | | | |
|---|---|---|---|
| 3,929,006 A | | 12/1975 | Boggs et al. |
| 4,380,807 A | * | 4/1983 | Reynard ...................... 367/97 |
| RE31,509 E | * | 1/1984 | Neidell ....................... 367/100 |
| 4,470,048 A | * | 9/1984 | Short, III .................... 367/100 |
| 4,596,144 A | | 6/1986 | Panton et al. ................. 73/620 |
| 4,620,285 A | | 10/1986 | Perdue |
| 4,679,152 A | | 7/1987 | Perdue |
| 4,831,565 A | | 5/1989 | Woodward .................... 367/99 |
| 4,992,998 A | * | 2/1991 | Woodward .................... 367/98 |
| 5,173,881 A | * | 12/1992 | Sindle ........................ 367/101 |
| 5,277,064 A | | 1/1994 | Knigga et al. |
| 5,438,247 A | | 8/1995 | Kim et al. |
| 5,717,169 A | | 2/1998 | Liang et al. |
| 6,108,269 A | * | 8/2000 | Kabel .......................... 367/98 |

FOREIGN PATENT DOCUMENTS

| GB | 2230608 | 10/1990 | |
|---|---|---|---|
| JP | 356069569 A | * 6/1981 | ............. G01S/7/36 |

OTHER PUBLICATIONS

Borenstein and Koren, "Noise Rejection for Ultrasonic Sensors in Mobile Robot Applications", Proceeding of the 1992 IEEE International Conference on Robotics and Automation, Nice, France, 1727–1732, 1992.

Kuc and Siegel, "Efficient Representation of Reflecting Structures for a Sonar Naviagtion Model", IEEE, pp. 1916–1923, 1987.

Kuc and Viard, "Guiding Vehicles with Sonar: The Edge Problem", IEEE 1988 Ultrasonics Symposium, Chicago, Illinois, pp. 1–4.

Parnis and Drazan, "Recognition of unreliable ultrasonic range data in a robotic environment", 7 pages, 1988.

Sabatini, AM, "Active Hearing for External Imaging Based on an Ultrasonic Transducer Array", Proceedings of the 1992 IEEE/RSJ International Conference on Intelligent Robots and Systems, Raleigh, NC, Jul. 7–10, 1992, pp. 829–836.

Blazevic et al., "Mobile robot using ultrsonic sensors: study of a degraded mode" Robotica9:365–370, 1991.

(List continued on next page.)

Primary Examiner—Daniel Pihulic
(74) Attorney, Agent, or Firm—Fish & Richardson P.C.

(57) ABSTRACT

A pulse-echo sonar scanner for a mobile robot includes a transmitter which generates a pulse signal, an acoustic transducer which transmits and receives acoustic signals, a receiver, means for determining performance characteristics of the transducer for a given pulse, means for storing the performance characteristics, and means for determining threshold levels for an echo based on the stored performance characteristics.

21 Claims, 6 Drawing Sheets

OTHER PUBLICATIONS

Borenstein et al., "Noise Rejection for Ultrasonic Sensors in Mobile Robot Applications", Proceeding of the 1992 IEEE International Conference on Robotics and Automation, Nice, France, 1727–1732, 1992.

Bozma et al., "Building a Sonar Map in a Specular Environment Using A Single Mobile Sensor" *IEEE Transactions on Pattern Analysis and Machine Intelligence*13:(12):1260–1269, 1991.

Bozma et al., "Characterizing the Environment Using Echo Energy, Duration, and Range: the ENDURA Method" *Proceedings of the 1992 IEEE/RSJ International Conference on Intelligent Robots and Systems*, Raleigh, NC, 813–820, 1992.

Drotning et al., "A VMEbus Ultrasonic Sensor Controller for Mapping and Servo Control in Robotic Systems" *Intelligent Systems Department II, Sandia National Laboratories*, Albuquerque, NM, 37–44.

Elfes "A Sonar–Based Mapping and Navigational System" *IEEE*, 1151–1156, 1986.

Everett "A Multi–Element Ultra Sonic Ranging Array" *Naval Sea Systems Command, Washington, DC*, pp. i–58, 1985.

Higuchi et al., "B–Mode Imaging Using Si Ultrasonic Image Sensor" *Microelectronics Research Laboratories, NEC Corporation, Shimokuzawa, Sagamihara, Kanagawa 229, Japan, R&D Laboratory, NEC Home Electronics Ltd., Takatsu–ku, Kawasaki, Kanagawa 213, Japan, C&C Systems Research Laboratories, NEC Corporation, Miyamae–ku, Kawasaki, Kanagawa 213, Japan*, 1–6, Figs. 1–8.

Horiguchi "A Digital Phase Delay Compensation Beam–Forming Scheme for Ultrasonic Imaging" *Journal of Applied Physics*27(27–1):215–217. 1988.

Hong et al., "Analysis of Ultrasonic Differentiation of Three Dimensional Corners, Edges and Planes", *Proceedings of the 1992 IEEE, International Conference on Robotics and Automation*, Nice, France, 580–584, 1992.

Kay "Airborne Ultrasonic Imaging of a Robot Workspace" University of Canterbury, New Zealand, 287–296.

Kuc "Three–dimensional tracking using qualitative bionic sonar" Robotics and Autonomous Systems *Elsevier Science*11:213–219, 1993.

Kuc et al., "Docking Mobile Robots Using a Bat–like Sonar" *Proceedings of the 1992 IEEE/RSJ International Conference on Intelligent Robots and Systems*, Raleigh, NC, 1439–1444, 1992.

Kuc et al., "Navigating Vehicles Through an Unstructured Environment with Sonar", IEEE, 1422–1426, 1989.

Kuc et al., "A Physically Based Navigation Strategy for Sonar–Guided Vehicles", The International Journal of Robotics Research 10(2):75–87, 1991.

Kuc et al., "Efficient Representation of Reflecting Structures for a Sonar Navigation Model" *IEEE*, 1916–1923, 1987.

Kuc et al., "Guiding Vehicles with Sonar: The Edge Problem" *Dept. of Electrical Engineering, Yale University*, New Haven, CT 06520, 1–4.

Kuroda et al., "Ultrasonic Imaging System for Robots Using an Electronic Scanning Method" Robot Sensors, 271–285.

Lang et al., "Characterizing and modeling a sonar ring" *Mobile Robots IV*1195:291–304, 1989.

Langer et al., "Sonar based Outdoor Vehicle Navigation and Collision Avoidance" *Proceedings of the 1992 IEEE/RSJ International Conference on Intelligent Robots and Systems*, Raleigh, NC, 1445–1450, 1992.

LeMay et al., "Error Minimization and Redundancy Management for a Three Dimensional Ultrasonic Ranging System" *Proceedings of the 1992 IEEE/RSJ International Conference on Intelligent Robots and Systems*, Raleigh, NC, 837–844, 1992.

Lim et al., "Physically Based Sensor Modeling for a Sonar Map in a Specular Environment" *Proceedings of the 1992 IEEE International Conference on Robotics and Automation*, Nice, France, 1714–1719, 1992.

Mataric "Qualitative Sonar Based Environment Learning for Mobile Robots" *Mobile Robots IV*1195:305–314, 1989.

Matthies et al., "Integration of Sonar and Stereo Range Data Using a Grid–Based Representation" *IEEE*, 232–238, 1988.

McKerrow et al., "An Introduction to the Physics of Echolocation" *Third Conference on Robotics, Australian Robot Association*, 1–19, 1990.

McKerrow "Simulation of Sonar Echolocation" *Dept. of Computing Science, University of Wollongong, Australia*, 10 pages.

Morcuo et al., "Mobile Robot Multitarget Tracking in dynamic Environments" *Proceedings of the 1992 IEEE/RSJ International Conference on Intelligent Robots and Systems*, Raleigh, NC, 1464–1469, 1992.

Nagashima et al., "Ultrasonic sensing for a mobile robot to recognize an environment—Measuring the normal direction of walls—" *Proceedings of the 1992 IEEE/RJS International Conference on Intelligent Robots and Systems*, Raleigh, NC, 805–812, 1992.

Parnis et al., "Recognition of unreliable ultrasonic range data in a robotic environment" *MEMS*, 1988.

Pomeroy et al., "Ultrasonic Distance Measuring and Imaging Systems for Industrial Robots", *Robot Sensors*2:261–270, 1986.

Pomeroy et al., "Evaluation of ultrasonic inspection and imaging systems for robotics using TLM modelling" *Robotica*9:283–290, 1991.

Rafiq et al., "The performance of capacitive ultrasonic transducers using v–grooved backplates" *Meas. Sci. Technol.* 2:168–174, 1991.

Sabatini "Active hearing for External Imaging Based on an Ultrasonic Transducer Array" Proceeding of the 1992 IEEE/RSJ International Conference on Intelligent Robots and Systems, Raleigh, NC, 829–836, 1992.

Sasaki et al., "Classification of Objects'Surface by Acoustic Transfer Function" *Proceedings of the 1992 IEEE/RSJ International Conference on Intelligent Robots and Systems*, Raleigh, NC, 821–828, 1992.

Sun et al., "Computer simulation of sensor–based robot collision avoidance in an unknown environment" *Proceedings of the 1992 IEEE/RSJ International Conference on Intelligent Robots and System*, Raleigh, NC,291–302, 1986.

Takanashi et al., "A Robotic Ultrasonic Imaging System Using A Si Phased–array Receiver" *Industrial Symposium Industrial Robots*, Kawaski, Japan, 6 pages, 1989.

Walter "The Sonar Ring: Obstacle Detection for a Mobile Robot" *IEEE*1574–1579, 1987.

van Turennout et al., "Following a Wall with a Mobile Robot using Ultrasonic Sensors" *Proceedings of the 1992 IEEE/RSJ International Conference on Intelligent Robots and Systems*, Raleigh, NC, 1451–1456, 1992.

Yang et al., "Design of Ultrasonic Linear Array System for Multi–Object Identification" *Proceedings of the 1992 IEEE/ RSJ International Conference on Intelligent Robots and Systems*, Raleigh, NC, 1625–1632, 1992.

"4. The Tympanic–nerve Response in Noctuid Moths" *Tympanic Response in Moths*, 34–99.

* cited by examiner

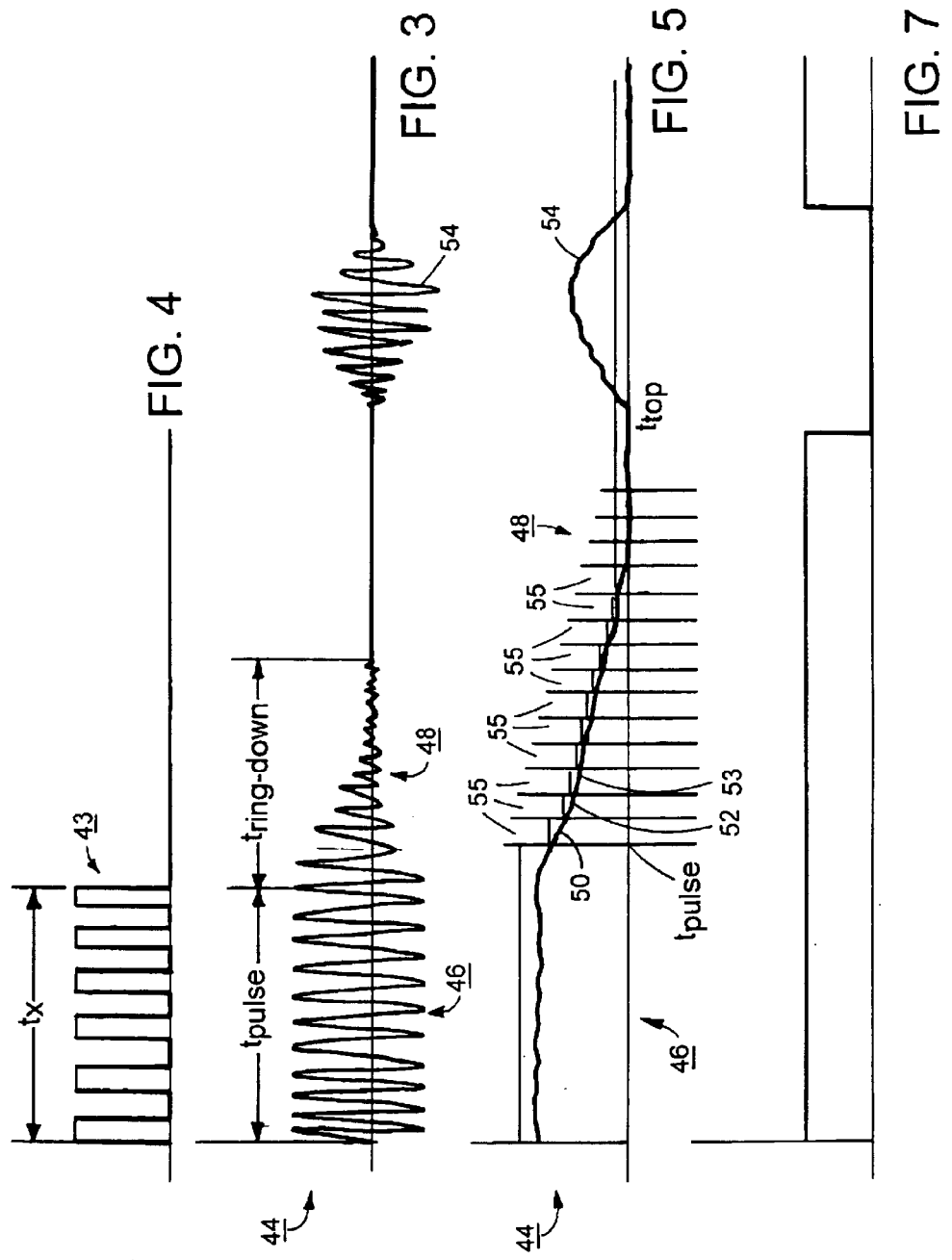

SONAR SCANNER

CROSS-REFERENCE TO RELATED APPLICATIONS

This application claims priority from U.S. Provisional Application No. 60/222,542, filed on Aug. 3, 2000, the contents of which are hereby incorporated by reference into this application as if set forth herein in full. U.S. patent application Ser. No. 09/826,209, filed Apr. 4, 2001, and U.S. Provisional Application No. 60/194,922, filed Apr. 4, 2000 are also incorporated by reference into this application as if set forth herein in full.

TECHNICAL FIELD

This invention relates generally to using sound waves to detect objects and, more particularly, to a sonar scanner that uses sound waves to detect objects in the environment of a mobile robot.

BACKGROUND

A mobile robot senses objects in its environment in order to determine its own location, map the environment for later localization and navigation, and, in non-static environments, to avoid obstacles.

A number of obstacle detection systems are currently in use, including complex computer vision systems, scanning laser range finders, and arrays of discrete ultrasonic transducers. Computer vision and scanning laser range finders tend to be prohibitively expensive in many applications. Mobile robots therefore often use ultrasonic sonar devices for obstacle avoidance.

The word "sonar" is an acronym for "SOund Navigation and Ranging". A sonar scanner typically includes a transmitter, a transducer, a receiver, and a signal processor. An electrical impulse (or "pulse"), usually a waveform, from the transmitter is converted into a sound wave by the transducer and propagated in a given direction. When the sound wave strikes an object, it rebounds, producing an "echo". This echo strikes the transducer. The transducer converts the echo into an electrical signal, which is amplified by the receiver and fed into a detector and stored for processing.

Since the speed of sound in any given environment is known, the time lapse between the transmitted signal and the received echo can be measured and the distance to an object that produced the echo determined. This time lapse is called the "time of flight".

One configuration for producing the transmitted signal and receiving the echo is a sonar ring. A sonar ring includes a number of transducers positioned around a robot to allow simultaneous sensing in more than one direction. A sonar ring may include any number of transducers and may or may not provide detection in a 360° field, depending on the number, placement and echo field of the transducers. For example, where each transducer's echo field covers 15° of radial space, a robot would need 24 evenly-spaced and directed transducers in order to have full 360° coverage.

This high number of sonar components has a number of drawbacks, including cost. Not only do sonar ring systems eliminate many of the cost benefits of using a sonar-based system, sonar rings often produce data of questionable quality due to the increased amount of acoustic energy being transmitted into the environment from multiple transducers. This acoustic energy may reflect off of multiple objects, resulting in multipath reflections. Multipath reflections are echoes that have not traveled in a direct path from the object to the receiver. For example, an echo that reflects off of one or more walls will have a longer time of flight and appear as an object farther away from the sonar scanner than it is in fact.

Thus, the transducer is subject to receiving sound waves from several sources, not just the intended echo. Distinguishing between the echo, spurious signals and/or extraneous noise is one challenge faced in designing a sonar scanner for a mobile robot or other application. In addition to multipath reflections, examples of extraneous environmental noise include acoustic steady state and periodic noise, acoustic impulse noise, electrical impulse, and ultrasonic noise from intentional sources, such as other robots, ultrasonic door openers, etc.

In a sonar scanner, the transducer emits a signal (or pulse) having a finite duration, $t_{emit}$. Conventionally, during the process of emitting the pulse, the receiver is disabled by a system controller as it waits for the transducer to cease operation in order to begin listening for the echo. The time that the receiver is disabled is known as the "blanking time" $t_{blank}$. The receiver is disabled in order to be sure that it does not become saturated as it detects the transducer emitting the sound wave. A byproduct of this delay, i.e., the receiver blanking time, is that it prevents the sonar scanner from detecting real objects within a certain distance.

Typically, the duration of the pulse signal is reduced in order to reduce the minimum measurable distance of the sonar scanner. Due to its mechanical nature, however, the transducer continues to vibrate even after the transmitter signal has ceased. This continued vibration is typically referred to as the "ring-down". This additional latency in the system extends $t_{emit}$, so that the total time of the signal can be characterized as the duration of the pulse ($t_{pulse}$) plus the duration of the ring-down ($t_{ring-down}$). Thus, the ring-down makes it difficult for a sonar scanner to detect objects within a certain distance. In the prior art, the minimum detection distance is about one foot.

In addition, mobile robot sonar scanners also face challenges from extraneous noise in the environment. For example, if the environment contains a continuous source of acoustic or electrical noise, such as a vacuum cleaner or air conditioning unit, the sonar scanner may be susceptible to this noise. The robot itself may be a source of continuous noise, which could also affect the ability of the sonar scanner to detect echoes.

SUMMARY

In general, in one aspect, the invention is directed to a system for transmitting a sound wave comprised of a first portion and a second portion, obtaining a characteristic of the second portion, storing the characteristic, and using the characteristic to detect an echo of another sound wave. This aspect of the invention may include one or more of the following features.

The first portion may be a pulse signal and the second portion may be a ring-down signal. The ring-down signal may be a signal that decays in amplitude over time. The ring-down signal may be a function of a transducer that transmits the pulse signal. The characteristic may include an amplitude in the ring-down signal.

The system may include transmitting the other sound wave comprised of a first portion and a second portion, receiving an echo of the other sound wave, and analyzing the echo of the other sound wave based on the characteristic. Analyzing the echo may include distinguishing the second portion of the other sound wave from the echo of the other sound wave. Distinguishing the second portion may include detecting an amplitude in the echo based on the characteristic. Detecting the amplitude in the echo may include assigning a threshold based on the characteristic and comparing the amplitude in the echo to the threshold. The amplitude in the echo is detected if the amplitude in the echo exceeds the threshold.

In general, in another aspect, the invention is directed to a system for measuring ambient noise at transmission of a first signal comprised of a pulse and a decaying portion, obtaining an amplitude in the decaying portion, removing the ambient noise from the amplitude, and using the amplitude with removed ambient noise to distinguish a decaying portion of a second signal from an echo of the second signal. This aspect of the invention may include one or more of the following features.

Using the amplitude to distinguish the decaying portion may include measuring ambient noise at transmission of the second signal, combining the ambient noise and the amplitude, and comparing the decaying portion of the second signal with the combined ambient noise and the amplitude. The decaying portion may include a ring-down signal that results from a transducer transmitting the pulse. The ambient noise may be electrical and/or acoustic noise. The system may include transmitting the second signal and receiving the echo of the second signal.

In general, in another aspect, the invention is directed to a system for distinguishing an echo of a transmitted signal from impulse noise. The system includes receiving a signal having an amplitude, measuring a duration of the amplitude, and determining if the duration exceeds a period. If the duration exceeds the period, the signal is the echo of the transmitted signal and, if the duration does not exceed the period, the signal is the impulse noise. This aspect may include one or more of the following features.

The period may be a fraction (e.g., 1/10) of a period of the transmitted signal. The impulse noise may be electrical noise and/or acoustic noise. If the signal is impulse noise, it may be ignored.

In general, in another aspect, the invention is directed to a system for transmitting a signal towards two objects, a first of the objects being in front of a second of the objects, receiving a first echo from the two objects, and receiving a second echo from the two objects. If the second echo is comprised of an amplitude having a greater amplitude than the first echo, the system uses the first echo to determine information relating to the first object and uses the second echo to determine information relating to the second object. This aspect of the invention may include one or more of the following.

The information relating to the first object includes a distance to the first object. The information relating to the second object includes a distance to the second object. Data that corresponds to the first echo and/or the second echo is stored. The first object may be acoustically-weaker than the second object.

In general, in another aspect, the invention is directed to a system for transmitting a waveform having a predetermined shape, receiving a signal, analyzing a shape of the signal, and determining if the signal comprises an echo of the waveform based on the analysis of the shape of the signal. This aspect of the invention may include one or more of the following features.

If the signal has substantially the predetermined shape, the signal is determined to be an echo of the waveform. If the signal deviates beyond a certain tolerance from the predetermined shape, the signal is determined not to be an echo of the waveform.

In general, in another aspect, the invention is directed to a pulse-echo sonar scanner for a mobile robot. The sonar scanner includes a transmitter which generates a pulse signal, an acoustic transducer which transmits and receives acoustic signals, a receiver, means for determining performance characteristics of the transducer for a given pulse, means for storing the performance characteristics, and means for determining threshold levels for an echo signal based on the stored performance characteristics. This aspect of the invention may include one or more of the following features.

The acoustic transducer is capable of rotation through 360°. A controller may be used to control an angular position of the acoustic transducer. The scanner may include a reflective surface on the acoustic transducer that is controlled by the controller.

In general, in another aspect, the invention is directed to a pulse-echo sonar scanner for a mobile robot. The sonar scanner includes a transmitter which generates a pulse signal, a single acoustic transducer which transmits and receives acoustic signals, a receiver, means for determining a level of ambient noise in an environment, and means for adjusting a threshold level of the receiver such that the threshold level is at least as high as the level of ambient noise.

In general, in another aspect, the invention is directed to a method of adjusting threshold levels on a mobile robot scanner. The method includes measuring ring-down characteristics of the mobile robot scanner, creating a dynamic threshold level based on the ring-down characteristics, and applying the dynamic threshold levels to received signals.

In general, in another aspect, the invention is directed to a method of adjusting threshold levels on a mobile robot scanner to compensate for effects of ambient noise. The method includes measuring the ambient noise and adjusting the threshold levels such that the threshold levels are at least as high as a level of the ambient noise.

Other features and advantages of the invention will become apparent from the following description, including the claims and drawings.

BRIEF DESCRIPTION OF THE DRAWINGS

FIG. 3 is a graph showing a sound wave produced by the sonar scanner.

FIG. 4 is a graph showing a waveform used to excite a transducer in the sonar scanner to produce the sound wave.

FIG. 5 is a graph showing amplitude thresholds for the sound wave of FIG. 3.

FIG. 7 is a graph of a pulse that is transmitted in response to detection of an echo.

DESCRIPTION

Figure 1:
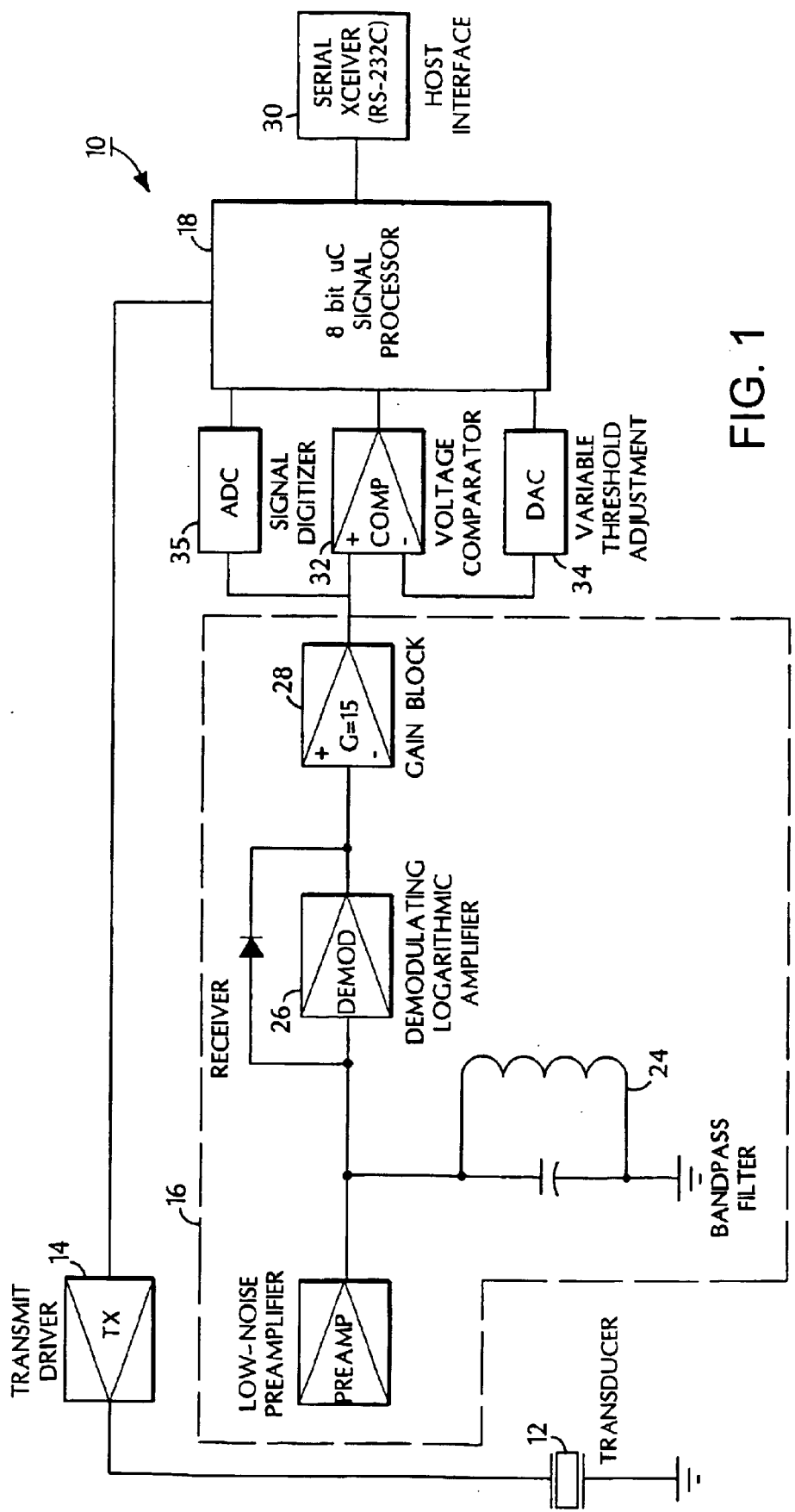
FIG. 1 is a block diagram of circuit elements that make up a sonar scanner.

FIG. 1 shows a block diagram of a sonar scanner 10 for a mobile robot. Sonar scanner 10 includes a transducer 12, a transmitter 14 for generating a sound wave, and a receiver 16 for receiving an echo of that sound wave. Transmitter 14 produces electrical signals based on the output of signal processor 18, which cause transducer 12 to vibrate and thereby output sound waves.

Transducer 12 is also responsive to received sonar echoes produced from the transmitted sound waves. The received echoes are transmitted from transducer 12 to receiver 16, where they are demodulated, digitized, and transmitted to signal processor 18 for processing.

To this end, receiver 16 includes a low-noise pro-amplifier 22 to amplify the received echo signals, a bandpass filter 24 to remove signals outside of the echo frequency range, and a logarithmic demodulated amplifier 26 and gain block 28 to amplify and acquire the envelope of the filtered signals. Analog-to-digital converter (ADC) 35 digitizes these signals and provides them to signal processor 18. Comparator 32 receives the analog signals and compares them to predetermined thresholds, as described below. These thresholds may be stored, e.g., in a memory of signal processor 18 and converted to analog form via digital-to-analog converter (DAC) 34 prior to comparison. Results of the comparison are provided to signal processor 18. Alternatively, the function of comparator 32 may be implemented in software running on signal processor 18.

A host interface 30 is also connected to signal processor 18. Host interface 30 allows a host, e.g., a mobile robot, to receive commands from signal processor 18 that are based on transmitted and received sound waves. For example, an object may be detected, as described below, using sonar scanner 10. Signal processor 18 may then notify the host processor of the object's existence.

Figure 2:
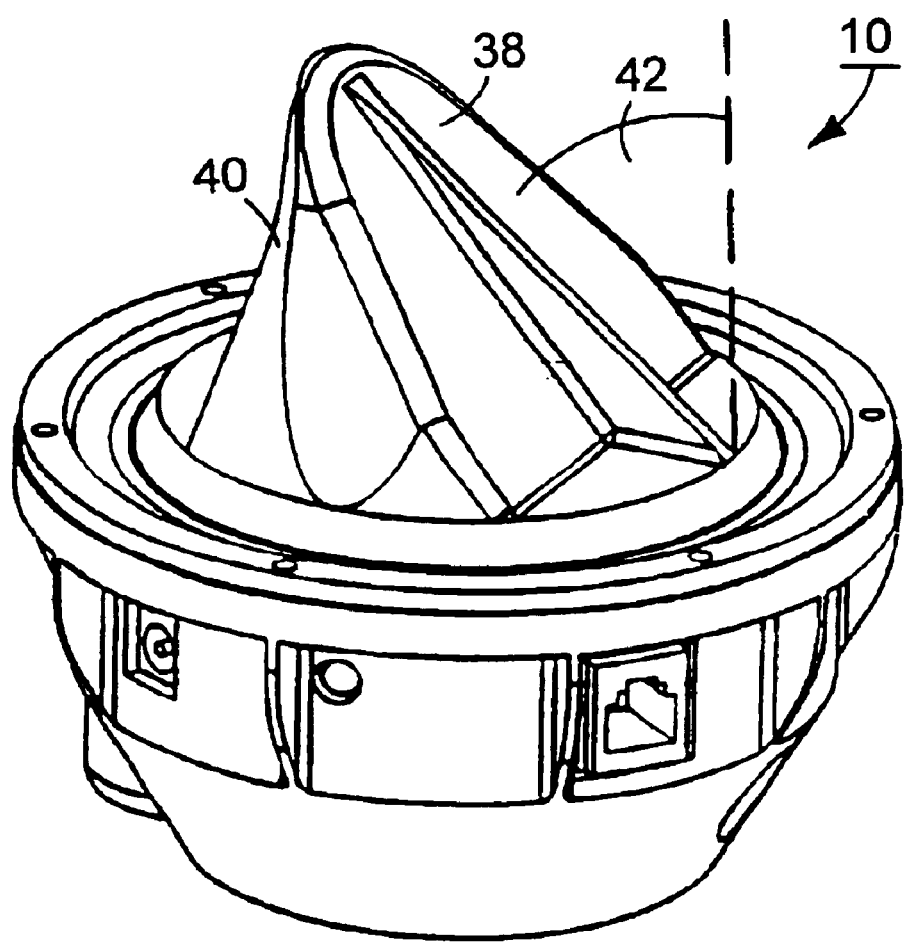
FIG. 2 is a perspective view of the sonar scanner.

FIG. 2 shows a perspective view of sonar scanner 10. Sonar scanner 10 includes an acoustic reflector 38 that is mounted on a servo motor (not shown). The servo motor rotates acoustic reflector 38 so that acoustic reflector 38 transmits the sound waves generated by transducer 12 at any angle of a 360° radial direction. The rotation is fluid, but slow enough so that the echo of a sound wave can be received by the sonar scanner. In other embodiments, the sonar scanner's rotation can be in discrete angular steps controlled by a stepper motor. The rate of rotation of the servo motor is determined by the time of flight of the sound wave. That is, the longer the time of flight, the slower the servo motor rotates and vice versa. A controller, such as signal processor 18, may be used to determine the rate of rotation.

Reflector 38 may be an angled structure for transmitting sound waves in a desired echo field. An echo field, in this context, is an area for receiving echoes from an object. Reflector 38 is contained within a cone-shaped housing 40 that allows transducer 12 to "pick-up" an echo in the echo field. The size and shape of the echo field are based on angle 42 and the shapes of the reflector and transducer.

In this embodiment, a plane-shaped acoustic mirror is used as the reflector. It is noted, however, that the reflector may be contoured to passively form the outgoing acoustic energy into a predetermined shape. This would also shape the transducer's receive sensitivity pattern. In this embodiment, the reflector is shaped so that it detects objects at a ±5° angle relative to a center-line of the reflector. By changing the shape of the reflector, and thus the shape of the outgoing energy, e.g., from a circular shape to an elliptical shape, it is possible for the reflector to pick-up objects at different angles.

This embodiment of sonar scanner 10 uses a single transducer (versus the "sonar ring" of the prior art, which used as many as 24 transducers, plus electronics). Using a single transducer, instead of multiple transducers, reduces the cost of sonar scanner 10 relative to its conventional counterparts. A single transducer also lowers the amount of acoustic energy in the environment. Also, a single transducer results in fewer sound waves reflecting off surfaces in a given area. Even in the preferred embodiment, the sonar scanner is subject to potential multipath errors. For example, the sonar scanner emits a sound wave facing east, the sound wave reflects off a wall, and the sonar scanner (still rotating), picks up the echo facing north. Such multipath errors can be reduced by adjusting the rotational velocity of the single transducer periodically to separate real objects from "ghost" objects. A single transducer also limits the echo field, thereby reducing receipt of false or spurious signals by the transducer.

The entire sonar scanner 10 may be mounted on a mobile platform having a drive mechanism that propels a robot. Any type of drive mechanism and robot may be used. Examples of a mobile platform that may be used are shown in U.S. patent application Ser. No. 09/826,209 and U.S. Provisional Application No. 60/194,922 incorporated by reference above.

FIG. 3 shows the profile of a sound wave 44 produced by transducer 12. The transducer is excited with a square wave 43 (FIG. 4) and outputs the sinusoidal waveform of FIG. 3. As shown, the waveform of sound wave 44 includes a pulse signal/portion 46 and a "ring-down" signal/portion 48. Ring-down signal 48 is produced by transducer 12 as transducer 12 settles. That is, while transducer 12 is excited by transmitter 14, transducer 12 produces pulse signal 46. When the electrical stimulus provided by transmitter 14 is removed from transducer 12, due to its mechanical nature, transducer 12 does not immediately cease operation. Rather, the operation of transducer 12 ceases gradually, resulting in the decaying waveform of ring-down signal 48. The length and period of ring-down signal 48 depends on the mechanical characteristics of transducer 12.

FIG. 5 shows the demodulated version of the sound wave 44. As shown, pulse signal 46 has an amplitude "A" and a time duration "$t_{pulse}$". While pulse signal 46 can have a variable waveform shape and frequency, sonar scanners for mobile robots typically use a sinusoidal waveform operating at an ultrasonic frequency of between 40 kHz (kilohertz) and 215 kHz, e.g., 92 KHz. It is noted, however, that sonar scanner 10 is not limited to use with these frequencies. Higher frequencies provide better resolution in general, but higher-frequency signals attenuate quicker, which reduces detection range.

After $t_{pulse}$, transducer 12 begins its ring-down, during which sound waves are produced having decreasing amplitudes 50, 52, 53, etc. These amplitudes are set as amplitude thresholds for the ring-down signal. Ring-down signal 48 has a duration of $t_{ringdown}$. Thus, the total duration of the sound wave produced by transducer 12 is $t_{blank}$, which equates to $t_{pulse}$ plus $t_{ringdown}$.

If there is an object in the transducer's echo field, sound wave 44 reflects off of that object and produces an echo 54 (FIG. 4). The demodulated echo 54 is shown in FIG. 5. The echo returns to the transducer at time $t_{TOF}$, where "TOF" stands for "time of flight". The distance (D) from transducer 12 to the object then can be calculated as follows $$D = v \cdot t_{TOF}/2,$$

where "v" in the above equation is the velocity of sound in the environment that transducer 12 is operating.

As noted above, the ring-down time can affect the distance that can be sensed using transducer 12 because it can be mistaken for an echo. A long ring-down time can make it difficult to detect objects that are in close proximity to the transducer. That is, the ring-down signal can interfere with transducer receipt of the echo, making it difficult for the transducer to distinguish between the echo and the ring-down signal.

Dynamic Threshold Control

In order to reduce the foregoing problems associated with detecting the echo in the presence of the ring-down signal, sonar scanner 10 uses dynamic threshold control. Dynamic threshold control is a process that uses amplitude detection with time varying thresholds to distinguish the echo from the ring-down signal within the ring-down period. Distinguishing the echo from the ring-down signal in this manner makes it possible for the sonar scanner to detect objects that are relatively close in proximity to the transducer.

Figure 6:
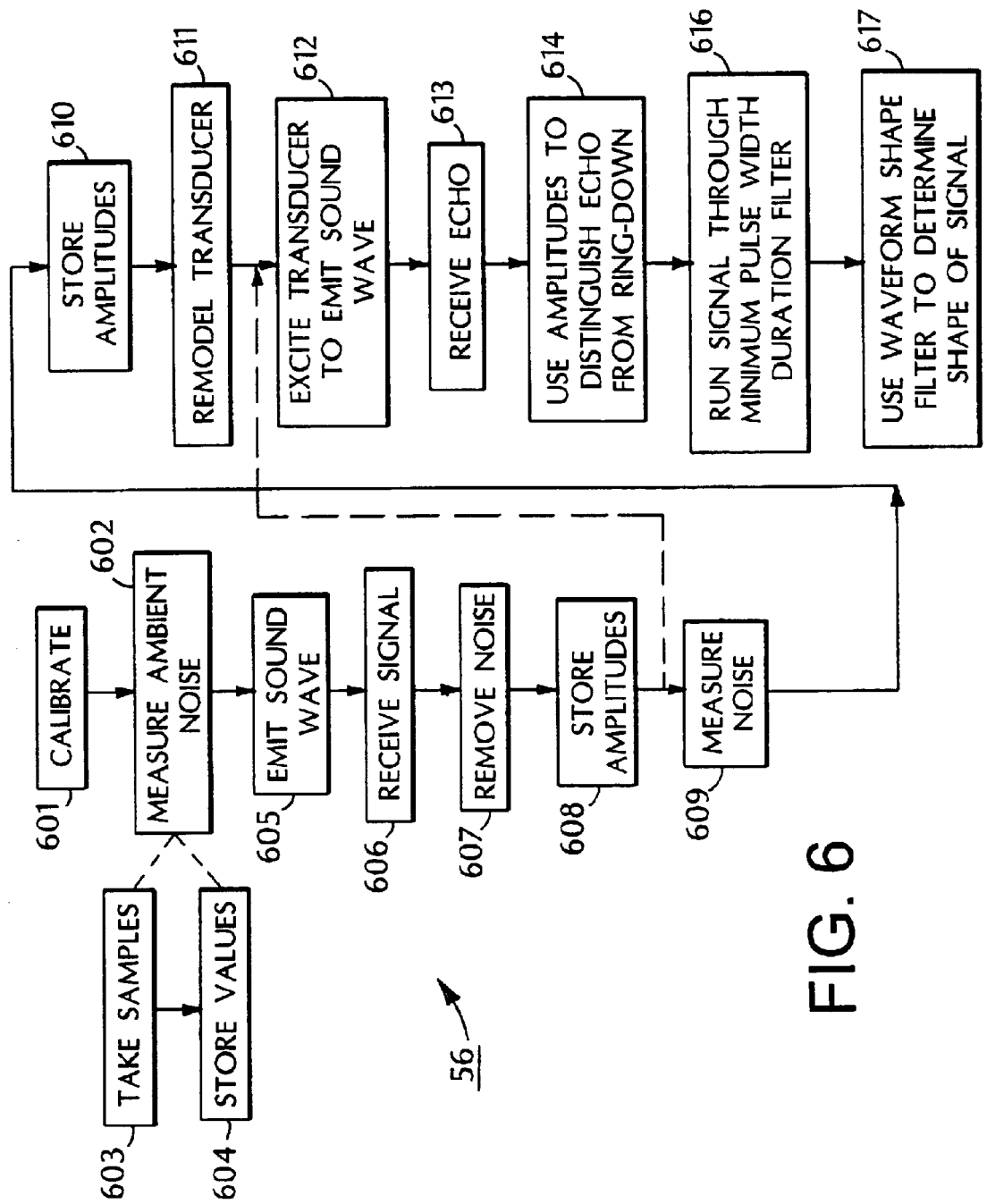
FIG. 6 is a flowchart showing a process performed by the sonar scanner for analyzing echoes.

Referring to FIG. 6, a dynamic threshold control process 56 is shown. Blocks 601 to 608 of FIG. 6 define the transducer modeling process and blocks 612 to 617 define the pulse-echo process. Process 56 includes a calibration phase, during which the processor determines the amount of ambient noise in the environment, i.e., the noise floor. The calibration phase can be performed at initial power-up of the scanner or it can be performed at any time from an idle mode by sending to the processor the appropriate commands via the host interface.

At calibration (601), the processor determines a zero degree reference point. The zero degree reference point is used by the device in determining where objects are located relative to the sensor. A Hall-Effect sensor (not shown), which is located on a PCB electronics board mounted on the robot, is used to determine the zero degree reference point. The Hall-Effect sensor acts as an absolute reference point. One of ordinary skill in the art will recognize that other sensors, such as an optical interrupter or a contact switch can be used instead.

The Hall-Effect sensor contains two elements: a sensor and a magnet. A motor rotates the magnet relative to the sensor. When the magnet crosses the sensor, a logic signal is generated, to indicate the zero degree reference point. A counter (not shown) receives the logic signal and begins counting to keep track of where the transducer is relative to the zero degree reference point. In this embodiment, calibration is performed twice; however, it may be performed any number of times.

Following position calibration, process 56 "models" transducer 12. What is meant by "model" in this context is that process 56 determines the ring-down characteristics of the transducer when it is excited, such as the amplitudes of sound waves produced by transducer 12. Process 56 uses this information to distinguish echoes from transducer ring-down, as described in more detail below.

During process 56 (modeling of transducer 12), the processor measures (602) the level of electrical and acoustic ambient noise in the robot's environment. Ambient environmental electrical and/or acoustic noise can affect the transducer's ability to detect the amplitude of an echo signal. For example, if amplitude thresholds are determined in the presence of a high level of ambient noise, the system may not accurately detect the amplitudes of echoes that are generated in environments having lower levels of ambient noise. In more detail, the ambient noise will increase the amplitudes of the echo, resulting in higher amplitude thresholds. Subsequent echoes measured in, e.g., less noisy environments may not be detected because their amplitudes will not reach the heightened thresholds. In measuring the level of ambient noise, process 56 takes (603) a number of samples (e.g., 64 samples) and stores (604) the maximum value of those samples.

Transmitter 14 excites transducer 12 with an impulse train. In response to the impulse train, transducer 12 vibrates, emitting (605) a sound wave. The sound wave includes a pulse signal 46 and a ring-down signal 48 (see, e.g., FIG. 3). Receiver 16 "listens" to the sound wave output by transducer 12. Receiver 16 receives (606) a sound wave, demodulates and digitizes the sound wave, and removes (e.g., subtracts) (607) the measured amount of ambient noise from the sound wave. Receiver 16 stores (608) amplitudes 55 (see FIG. 5) of the ring-down portion of the sound wave in an array of N (e.g., 16) memory elements, or "bins", within signal processor 18.

Process 56 then waits for a predetermined period of time following transmission of the sound wave. In this embodiment, the predetermined period of time is 50 ms (milliseconds); however, the invention is not limited to this time period. During this time period, the transmitted sound wave dissipates.

Process 56 repeats blocks 602 to 608 a number of times. In this embodiment, process 56 repeats blocks 602 to 608 16 times, although the blocks may be repeated any number of times. Each time blocks 602 to 608 are repeated, process 56 stores the amplitudes of the ring-down signal 48 (FIG. 5). Process 56 stores the largest amplitude of the ring-down signal and assigns these to be the amplitude thresholds. Alternatively, process 56 may process the amplitudes in order to assign the thresholds. For example, process 56 may average the amplitudes from corresponding cycles of different signals.

Process 56 uses the amplitude thresholds to distinguish between the ring-down signal and the echo. That is, the thresholds for the ring-down signal will generally be lower in amplitude than the echo. Comparing received signals to the amplitude thresholds thus determines which signals are ring-down signals (or extraneous noise) and which are echoes.

In one mode of operation, the acoustic reflector of sonar scanner 10 spins continuously throughout a 360° field of view while transmitting sound waves in the environment. In this mode, process 56 measures (609) the noise floor at the time of operation. Process 56 takes a number (e.g., 16) of samples of the receiver electrical and acoustic noise floor and stores (610) the peak amplitudes of the noise floor in memory.

Process 56 determines the angular velocity of the acoustic reflector assembly based on the maximum desired detection distance of the transducer. In this embodiment, the reflector does not move more than 8° in the amount of time that it takes for the transmitted sound wave to travel out a preset maximum detection distance to an object and back to the transducer. The acoustic reflector rotates at the determined velocity, which is controlled by a digital proportional-integral controller (not shown).

Process 56 remodels (611) transducer 12 using data obtained in blocks 609 and 610 every 368°, although remodeling may take place at other angles. For cycles in which remodeling does not take place, process 56 skips from block 608 directly to block 612. Normal data collection is suspended during remodeling. Remodeling takes place to adapt to changes in the transducer ring-down profile due to changing environmental conditions (e.g., temperature) and transducer degradation (e.g., material fatigue).

Process 56 uses the measurement of the ambient noise at the time that the transducer is remodeled to determine the threshold used in the above comparison. That is, process 56 combines (e.g., adds) the ambient noise measured at the time the transducer is remodeled with the stored amplitude values. This way, the amplitudes are adapted to the noise environment in which the echo occurs, hence the term "adaptive threshold". That is, the thresholds set by the amplitudes are modified take into account the ambient noise in the current environment of the echo.

Process 56 excites (612) transducer 12 with a waveform from transmitter 14 to transmit a sound wave. The fundamental frequency of the waveform and its pulse shape are programmable, thus making it possible to shape the waveform. Process 56 stores the angle of the acoustic reflector at the time the transducer is excited. This information is used to position objects relative to the robot in the environment.

In process 56, receiver 16 receives (613) an echo of the transmitted sound wave. Process 56 uses (614) the stored amplitudes from the ring-down portion of the sound wave to distinguish the ring-down portion from the echo. In this embodiment, process 56 collects data for three echoes from each transmitted sound wave, although the invention is not limited as such (i.e., data for more or less echoes may be collected, as desired). The data stored for each echo includes the time of flight, the peak amplitude of the demodulated echo, the duration of the echo, and the angle of the acoustic reflector at the time that the echo is received.

As data for each signal is received, process 56 runs the data through three software filters executing in signal processor 18 to determine if the signals are "valid" echoes from an object within the field of view of the transducer or the result of electrical and/or acoustic noise, such as the ring-down signal.

The filters include a dynamic threshold filter. The dynamic threshold filter analyzes the received signal in order to distinguish a valid echo of the pulse signal from the ring-down signal of the original sound wave or extraneous noise. Process 56 detects amplitudes of the signal based on the thresholds stored in memory.

In more detail, process 56 compares the amplitude of the received signal to a corresponding threshold from memory (e.g., 55 from FIG. 5). If the amplitude of the received signal exceeds the threshold, then the received signal is determined to be the echo of the pulse signal (see, e.g., echo 54 of FIG. 5). The dynamic threshold filter compares the ring-down signal of the transmitted sound wave to the combined amplitude and ambient noise values. The combined amplitude and ambient noise comprise the echo threshold for the current environment. That is, a signal at that level or above is determined to be an echo of the transmitted pulse signal of the sound wave. A signal below that level is determined to be a ring-down signal of the sound wave, or noise. In case an echo is detected, a pulse (FIG. 7) is transmitted to signal processor 18. Thus, the dynamic threshold filter is able to distinguish ring-down signals from echoes without regard to ambient noise. It is noted that the thresholds will be at least as high as the measured ambient noise, since the ambient noise is added to the amplitude values.

Impulse Noise

Process 56 also runs (616) the received signal through a minimum pulse width duration filter. The minimum pulse width duration filter measures the width of the signal to determine if it has greater than a predetermined duration.

In this regard, impulse noise, i.e., short duration, high amplitude noise, can adversely affect echo detection. The minimum pulse width duration filter therefore discounts impulse noise during echo detection. The minimum pulse width duration filter measures a duration of the detected echo and determines if the duration exceeds a predetermined period. The predetermined period may be obtained experimentally and stored in memory, or it may simply be assigned and stored. The predetermined period may be a fraction of the period of the transmitted signal. For example, it may be one-tenth of the period of the transmitted signal, or any other fraction thereof.

If the duration of the signal exceeds the predetermined period (and exceeds the appropriate amplitude threshold as described above), the minimum pulse width duration filter decides that the received signal is an echo of the pulse signal. If the duration of the signal does not exceed the predetermined period, the minimum pulse width duration filter decides that the signal is impulse noise. Impulse noise is simply ignored, whereas the echo may be used to determine information relating to an object, such as the distance to the object, as described above.

Waveform Shaping

Process 56 uses a waveform filter (617) to determine the shape of the echo. In this embodiment, the shape of the echo should match the shape of the transmitted pulse to within some preset tolerance. In process 56, transducer 12 transmits a sound wave that has been shaped, i.e., a waveform having a predetermined shape. The shape of the waveform is determined based on electrical signals from transducer 12. Changing these signals changes the shape of the waveform.

Transducer 12 receives a signal following the transmission. The shape filter analyzes the signal in order to determine if the signal is an echo of the transmitted sound wave. The shape filter performs the analysis by obtaining the shape of the received signal and comparing the shape of the received signal to the pre-stored shape of the transmitted sound wave. If the shapes are within a pre-set tolerance of one another, e.g., if they match by 90% or some other number, then the received signal is determined to be the echo of the transmitted sound wave. Otherwise, the received signal is determined not to be an echo.

If the dynamic threshold control filter, the minimum pulse width duration filter, and the waveform filter all indicate that the received signal is an echo, process 56 determines that the signal is an echo. In this case, the received signal may be used to determine the distance to an object or any other information relating thereto that can be ascertained based on the echo. If the received signal is not an echo, it is merely ignored.

It is noted that process 56 may be performed without using one or more of the dynamic threshold control filter, the minimum pulse width duration filter, and/or the waveform filter. Also, additional filters (not shown herein) may be added, as desired.

Modes of Operation

The velocity mode of operation, in which transducer 12 rotates, is described above. Other modes of operation also may be used. In the "position" mode of operation, process 56 rotates acoustic reflector 38 to a commanded position, where transducer 12 is continuously excited. For example, acoustic reflector 38 may be rotated to a position to focus on a particular object. At that position, data may be collected for the object. The remainder of the position mode is identical to that described above.

Process 56 may also operate in a "fire" mode. In the fire mode, the transducer emits a single sound wave and collects data from up to three echoes of that sound wave in the manner described above in the current position.

Multiple Object Detection and Validation

Process 56 may store information relating to multiple echoes from the same object, as described above. Process 70

Figure 8:
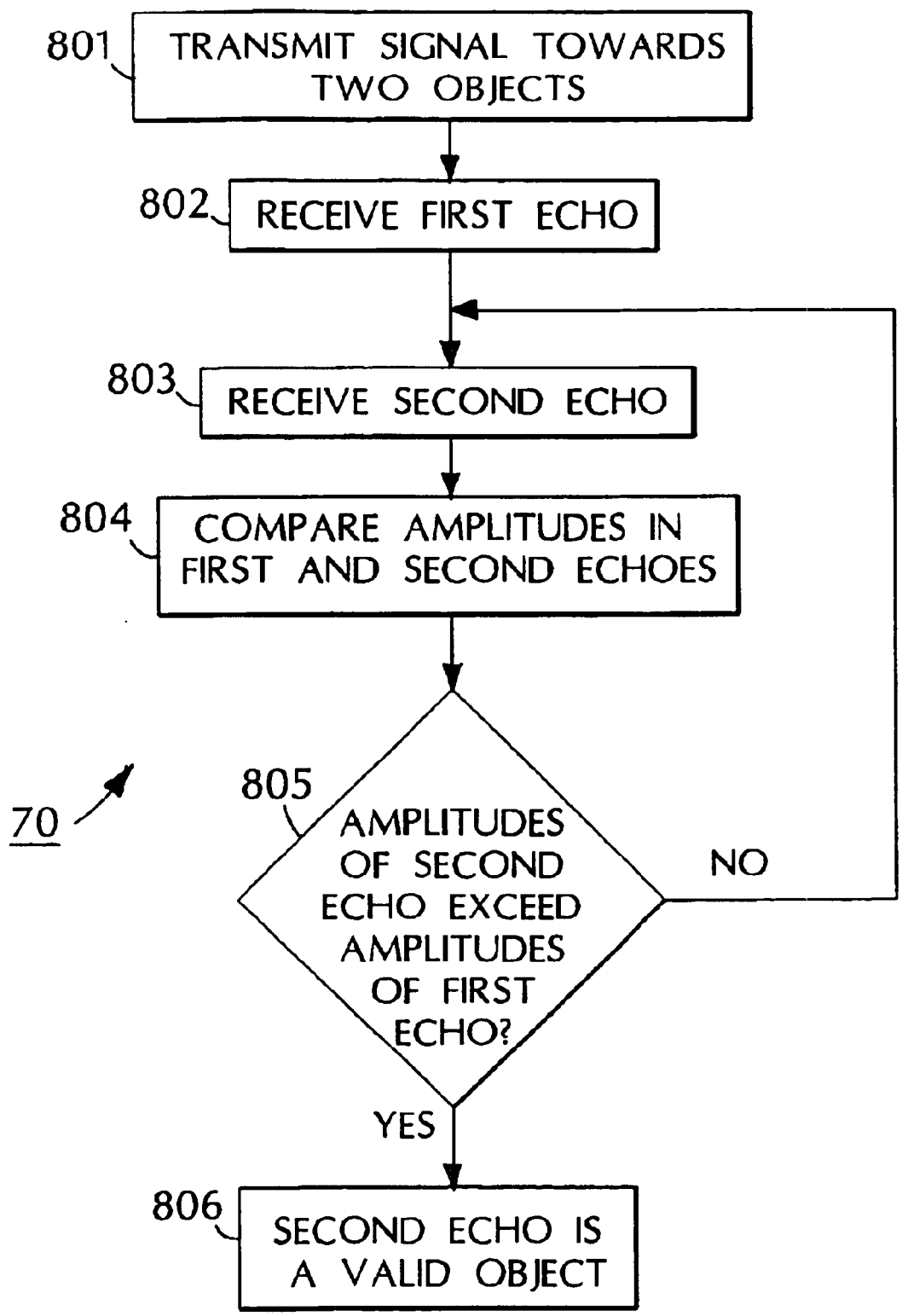
FIG. 8 is a flowchart showing a process performed by the sonar scanner for obtaining information from echoes produced by objects that are one in front of the other.

(FIG. 8), on the other hand, is used to determine information relating to objects that are positioned one in front of the other. In particular, process 70 detects echoes of objects in which an acoustically-weaker object is in front of an acoustically-stronger object.

In this context, an acoustically-weak object is an object that does not reflect sound waves well. For example, small and/or narrow objects, such as a lamppost, may not reflect sound waves as well as large flat objects, such as a wall. Likewise, the texture of an object may affect the object's ability to reflect sound waves. For example, hard, smooth objects will reflect sound waves better than soft or rough object.

Process 70 detects multiple (e.g., three) echoes in cases where an acoustically-weak object is positioned in front of an acoustically-stronger object relative to transducer 12. Process 70 does this by detecting echoes from the two objects that have increasing amplitudes. In this regard, although process 70 is described for the case of two objects, it may be used for any number of objects. Process 70 may also detect any number of echoes.

Figure 9:
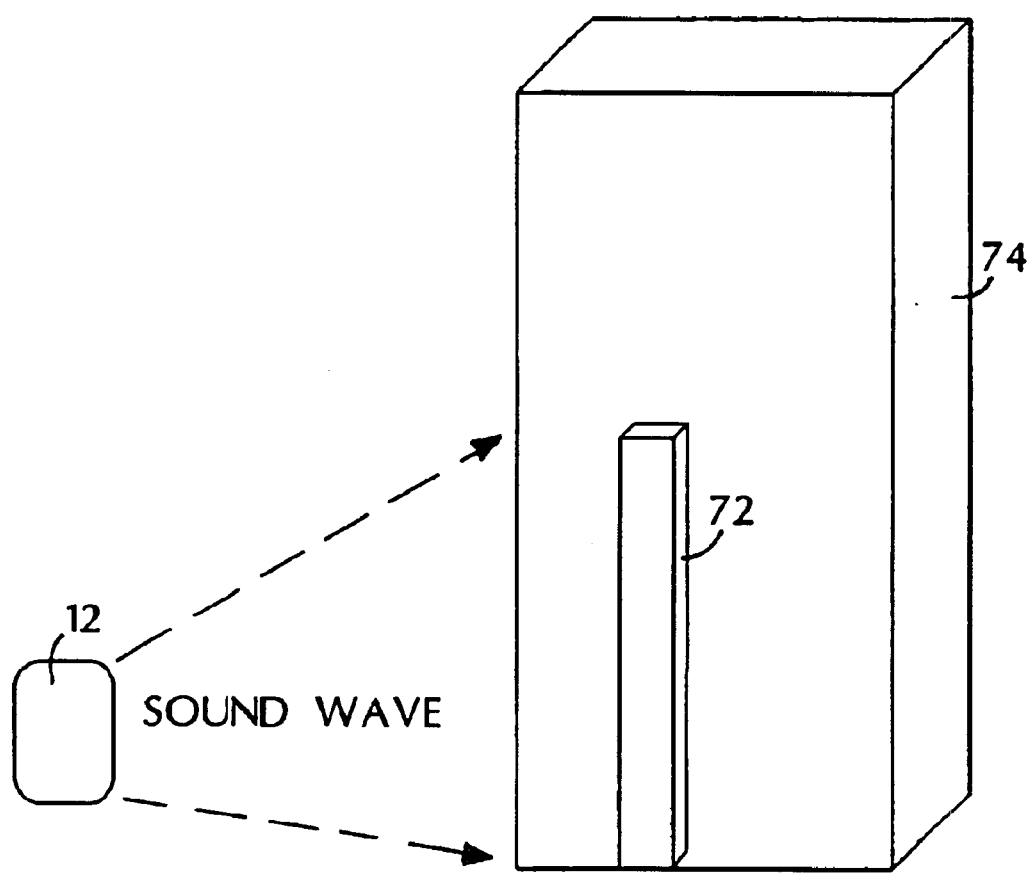
FIG. 9 is a perspective view of two objects that are positioned one in front of the other.

In process 70, transducer 12 transmits (801) a sound wave towards the two objects, such as objects 72 and 74 shown in FIG. 9. The sound wave maybe a signal, such as that shown in FIG. 3. Transducer 12 receives (802) a first echo from the objects and then receives (803) a second echo from the objects. Process 70 detects amplitudes in the first and second echoes and compares (804) the amplitudes in corresponding cycles of the echoes.

If the amplitudes of the second echo exceed the amplitudes of the first echo in corresponding cycles, this means that the object that reflected the second echo is acoustically-stronger than the object that reflected the first echo. If the amplitudes of the second echo exceed the amplitudes of the first echo (805), process 70 determines (806) that the second object is a valid object and not a multipath reflection (since process 70 assumes that a weaker signal behind a smaller signal is a multipath error). The two objects may then be analyzed, as described above. For example, process 70 may analyze its echoes to determine the distances to each of the objects from transducer 12. Process 70 may also store the information that it learns from the echoes in memory for later use. If the amplitudes of the second echo do not exceed the amplitudes of the first echo (805), process 70 returns to block 803, whereafter blocks 803 to 805 are repeated.

Process 70 may be performed alone or in conjunction with process 56 described above.

Architecture

Processes 56 and 70 are not limited to use with the hardware/software configuration of FIGS. 1 and 2; they may find applicability in any computing or processing environment. To the extent practicable, processes 56 and 70 may be implemented in hardware (e.g., an ASIC {Application-Specific Integrated Circuit} and/or an FPGA {Field Programmable Gate Array}), software, or a combination of hardware and software.

Processes 56 and 70 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 56 and 70.

Processes 56 and 70 may also be implemented using a computer-readable storage medium, configured with a computer program, where, upon execution, instructions in the computer program cause the computer to operate in accordance with processes 56 and 70.

Processes 56 and 70 may be used together or alone. Processes 56 and 70 may be used in conjunction with a mobile robot, as described herein, or outside the context of robotics. Processes 56 and 70 may be used to determine information other than that described above (i.e., distance). For example, processes 56 and 70 may be used to determine the shape of an object, the texture of an object, or any other information that can be obtained based on acoustic echoes from an object.

Other embodiments not described herein are also within the scope of the following claims.

What is claimed is:

1. A method comprising:

transmitting a signal;

receiving a first echo in response to the signal; and receiving a second echo in response to the signal;

wherein if an amplitude of the first echo exceeds a corresponding amplitude of the second echo, then the second echo is determined to be a multipath error from a single object; and wherein if an amplitude of the second echo exceeds a corresponding amplitude of the first echo, then the first and second echoes are determined to be from first and second objects, respectively, and the method further comprises:

using the first echo to determine information relating to the first object; and using the second echo to determine information relating to the second object.

2. The method of claim 1, wherein the information relating to the first object comprises a distance to the first object.

3. The method of claim 1, wherein the information relating to the second object comprises a distance to the second object.

4. The method of claim 1, further comprising storing data that corresponds to the first echo and/or the second echo.

5. The method of claim 1, wherein the first object is acoustically-weaker than the second object.

6. A method comprising:

transmitting a waveform having a predetermined shape;

receiving a signal;

analyzing a shape of the signal; and determining if the signal comprises an echo of the waveform based on analysis of the shape of the signal and the waveform having the predetermined shape;

wherein, if the signal has substantially the predetermined shape, the signal is determined to be an echo of the waveform.

7. A method comprising:

transmitting a waveform having a predetermined shape;

receiving a signal;

analyzing a shape of the signal; and determining if the signal comprises an echo of the waveform based on analysis of the shape of the signal and the waveform having the predetermined shape;

wherein, if the signal deviates beyond a certain tolerance from the predetermined shape, the signal is determined not to be an echo of the waveform.

8. An apparatus comprising:
a transducer which transmits a signal;
a receiver which receives a first echo and a second echo in response to the signal; and
a processor which compares amplitudes of the first and second echoes;
wherein if an amplitude of the first echo exceeds a corresponding amplitude of the second echo, then the processor determines that the second echo is a multipath error from a single object; and
wherein if an amplitude of the second echo exceeds a corresponding amplitude of the first echo, then the processor determines that the first and second echoes are from first and second objects, respectively, and the processor:
  uses the first echo to determine information relating to the first object; and
  uses the second echo to determine information relating to the second object.

9. The apparatus of claim 8, wherein the information relating to the first object comprises a distance to the first object.

10. The apparatus of claim 8, wherein the information relating to the second object comprises a distance to the second object.

11. The apparatus of claim 8; further comprising a memory which stores data that corresponds to the first echo and/or the second echo.

12. The apparatus of claim 8, wherein the first object is acoustically-weaker than the second object.

13. An apparatus comprising:
a transducer which transmits a waveform having a predetermined shape;
a receiver which receives a signal; and
a processor which analyzes a shape of the signal, and determines if the signal comprises an echo of the waveform based on analysis of the shape of the signal and the waveform having the predetermined shape;
wherein, if the signal has substantially the predetermined shape, the signal is determined to be an echo of the waveform.

14. An apparatus comprising:
a transducer which transmits a waveform having a predetermined shape;
a receiver which receives a signal; and
a processor which analyzes a shape of the signal, and determines if the signal comprises an echo of the waveform based on analysis of the shape of the signal and the waveform having the predetermined shape;
wherein, if the signal deviates beyond a certain tolerance from the predetermined shape, the signal is determined not to be an echo of the waveform.

15. A computer program stored on a computer-readable medium, the computer program comprising instructions that cause a processor to:
cause a signal to be transmitted;
receive a first echo in response to the signal; and
receive a second echo in response to the signal;
wherein if an amplitude of the first echo exceeds a corresponding amplitude of the second echo, then the second echo is determined to be a multipath error from a single object; and
wherein if an amplitude of the second echo exceeds a corresponding amplitude of the first echo, then the first and second echoes are determined to be from first and second objects, respectively, and the computer program provides for:
  using the first echo to determine information relating to the first object; and
  using the second echo to determine information relating to the second object.

16. The computer program of claim 15, wherein the information relating to the first object comprises a distance to the first object.

17. The computer program of claim 15, wherein the information relating to the second object comprises a distance to the second object.

18. The computer program of claim 15, further comprising instructions to store data that corresponds to the first echo and/or the second echo.

19. The computer program of claim 15, wherein the first object is acoustically-weaker than the second object.

20. A computer program stored on a computer-readable medium, the computer program comprising instructions that cause a processor to:
cause a waveform having a predetermined shape to be transmitted;
receive a signal;
analyze a share of the signal; and
determine if the signal comprises an echo of the waveform based on analysis of the shape of the signal and the waveform having the predetermined shape;
wherein, if the signal has substantially the predetermined shape, the signal is determined to be an echo of the waveform.

21. A computer program stored on a computer-readable medium, the computer program comprising instructions that cause a processor to:
cause a waveform having a predetermined share to be transmitted;
receive a signal;
analyze a shape of the signal; and
determine if the signal comprises an echo of the waveform based on analysis of the shape of the signal and the waveform having the predetermined shape;
wherein, if the signal deviates beyond a certain tolerance from the predetermined shape, the signal is determined not to be an echo of the waveform.

* * * * *